United States Patent [19]
Ishiwata et al.

[11] Patent Number: 5,443,047
[45] Date of Patent: Aug. 22, 1995

[54] FUEL INJECTION SYSTEM

[75] Inventors: Hiroshi Ishiwata; Takashi Ohishi; Atsushi Ueda; Naotake Ohi, all of Higashimatsuyama, Japan

[73] Assignee: Zexel Corporation, Tokyo, Japan

[21] Appl. No.: 224,782

[22] Filed: Apr. 8, 1994

[30] Foreign Application Priority Data

Apr. 9, 1993 [JP] Japan .................. 5-107705
Jul. 23, 1993 [JP] Japan .................. 5-202951

[51] Int. Cl.⁶ ................ F02M 41/14; F02D 41/40
[52] U.S. Cl. ...................... 123/446; 123/500; 123/506
[58] Field of Search ............ 123/299, 300, 446, 506, 123/500-501

[56] References Cited

U.S. PATENT DOCUMENTS

| | | | |
|---|---|---|---|
| 4,718,384 | 1/1988 | Takahashi | 123/447 |
| 4,730,585 | 3/1988 | Abe et al. | 123/300 |
| 4,748,954 | 6/1988 | Igashira et al. | 123/300 |
| 4,782,803 | 11/1988 | Kikuchi | 123/300 |
| 4,788,960 | 12/1988 | Oshizawa | 123/506 |
| 4,917,068 | 4/1990 | Takahashi et al. | 123/500 |
| 4,976,236 | 12/1990 | Brunel | 123/300 |
| 5,197,439 | 3/1993 | Gronenberg et al. | 123/506 |
| 5,261,366 | 11/1993 | Regueiro | 123/299 |
| 5,333,588 | 8/1994 | Cananagh | 123/506 |

FOREIGN PATENT DOCUMENTS

| | | |
|---|---|---|
| 210957 | 2/1987 | European Pat. Off. . |
| 0504401 | 9/1992 | European Pat. Off. . |
| 1-151751 | 6/1989 | Japan . |

Primary Examiner—Thomas N. Moulis
Attorney, Agent, or Firm—Wenderoth, Lind & Ponack

[57] ABSTRACT

A solenoid valve unit is provided in the middle of fuel supply path that leads to a compression space in an injection pump main body, and the fuel injection quantity is adjusted through the open and close control of the solenoid valve unit. In this fuel injection system, the plug valve is moved until it is seated on the valve seat during the preliminary injection that is performed prior to the main injection. An arrangement for leaking the fuel from within the compression space is provided in the injection pump main body and the time period during which the fuel in the compression space is leaked via the arrangement for leaking and the time period during which the fuel supply path is restricted with the plug valve being seated on the valve seat are combined to stabilize the movement of the plug valve. Consequently, an optimal small quantity is achieved for the preliminary injection that is nearly constant regardless of the rate of rotation of the engine. Also, if a drive pulse that closes the fuel supply path over the period during which the fuel is leaked is supplied to the solenoid valve unit, the solenoid valve unit needs to be operated only once and stable injection characteristics are achieved from the pilot injection through the main injection.

13 Claims, 11 Drawing Sheets

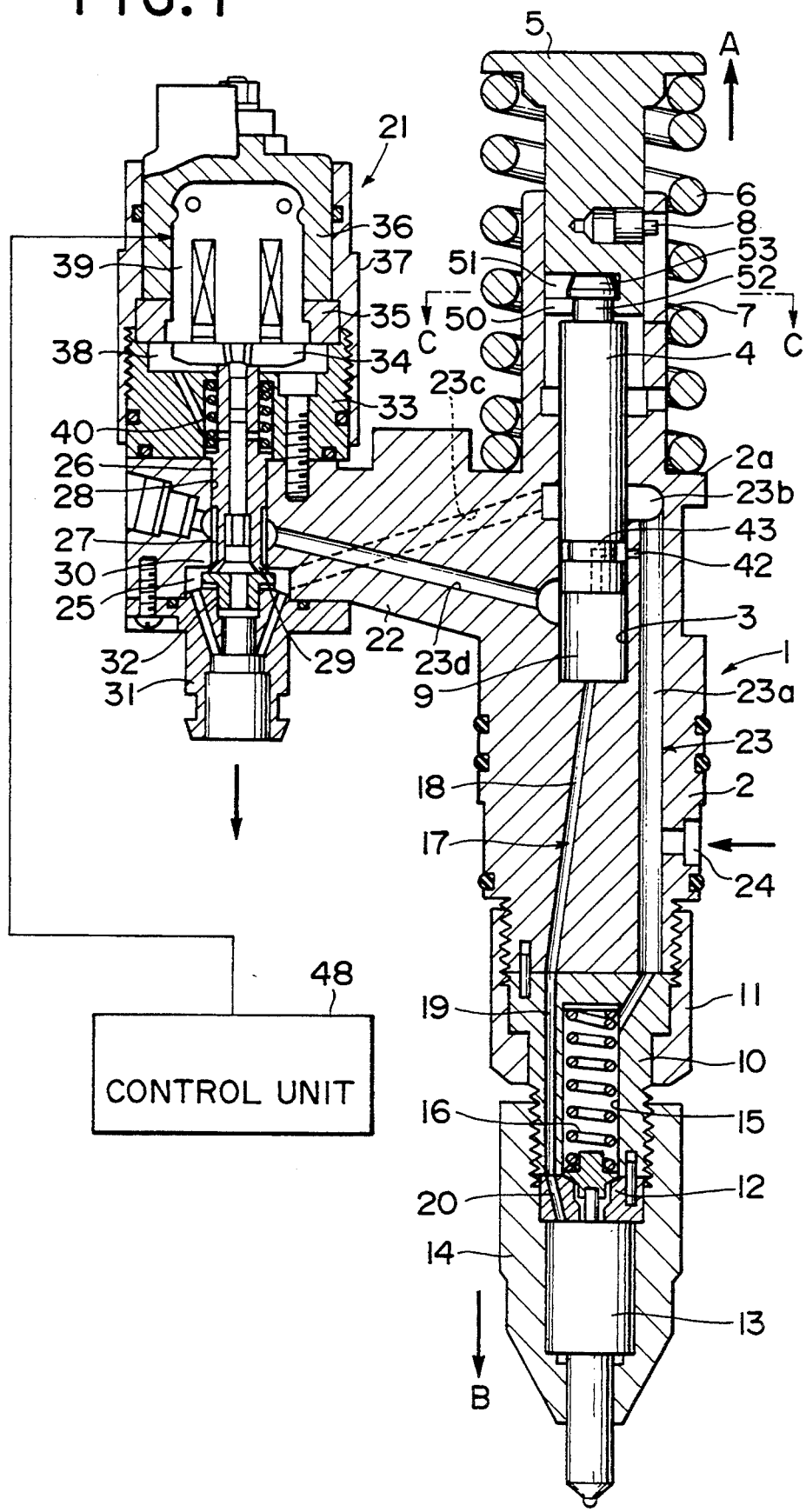

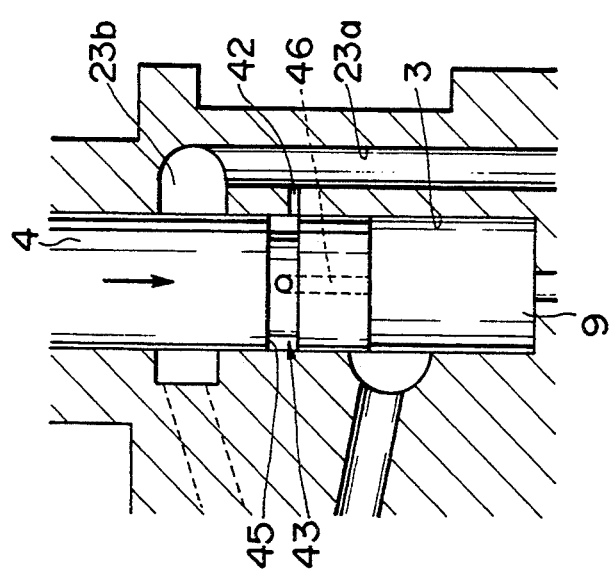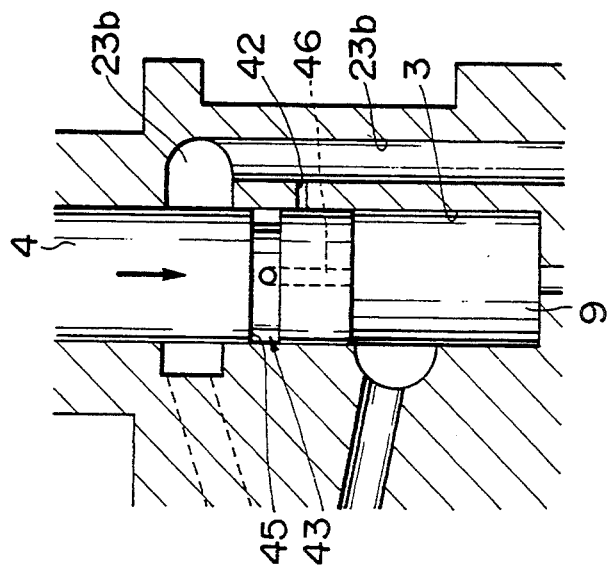

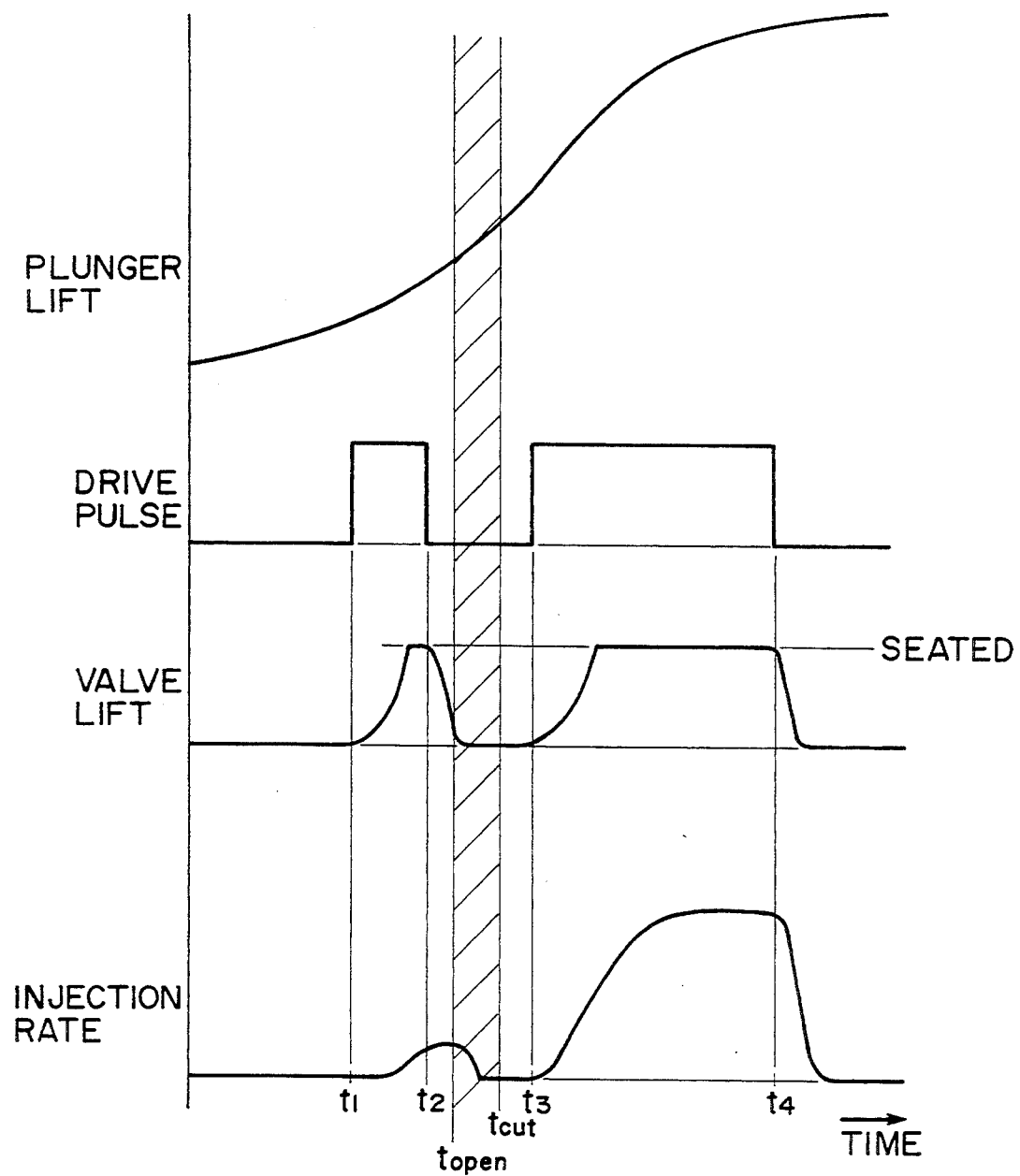

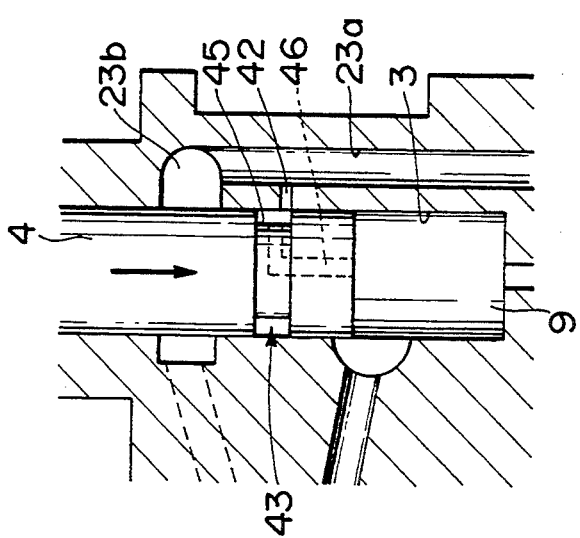
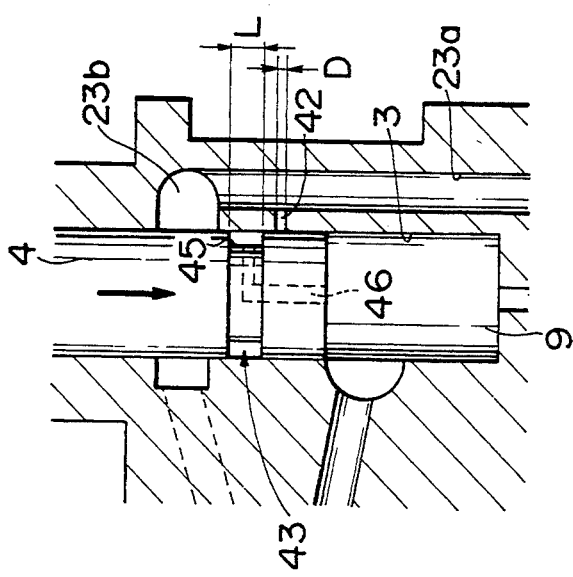

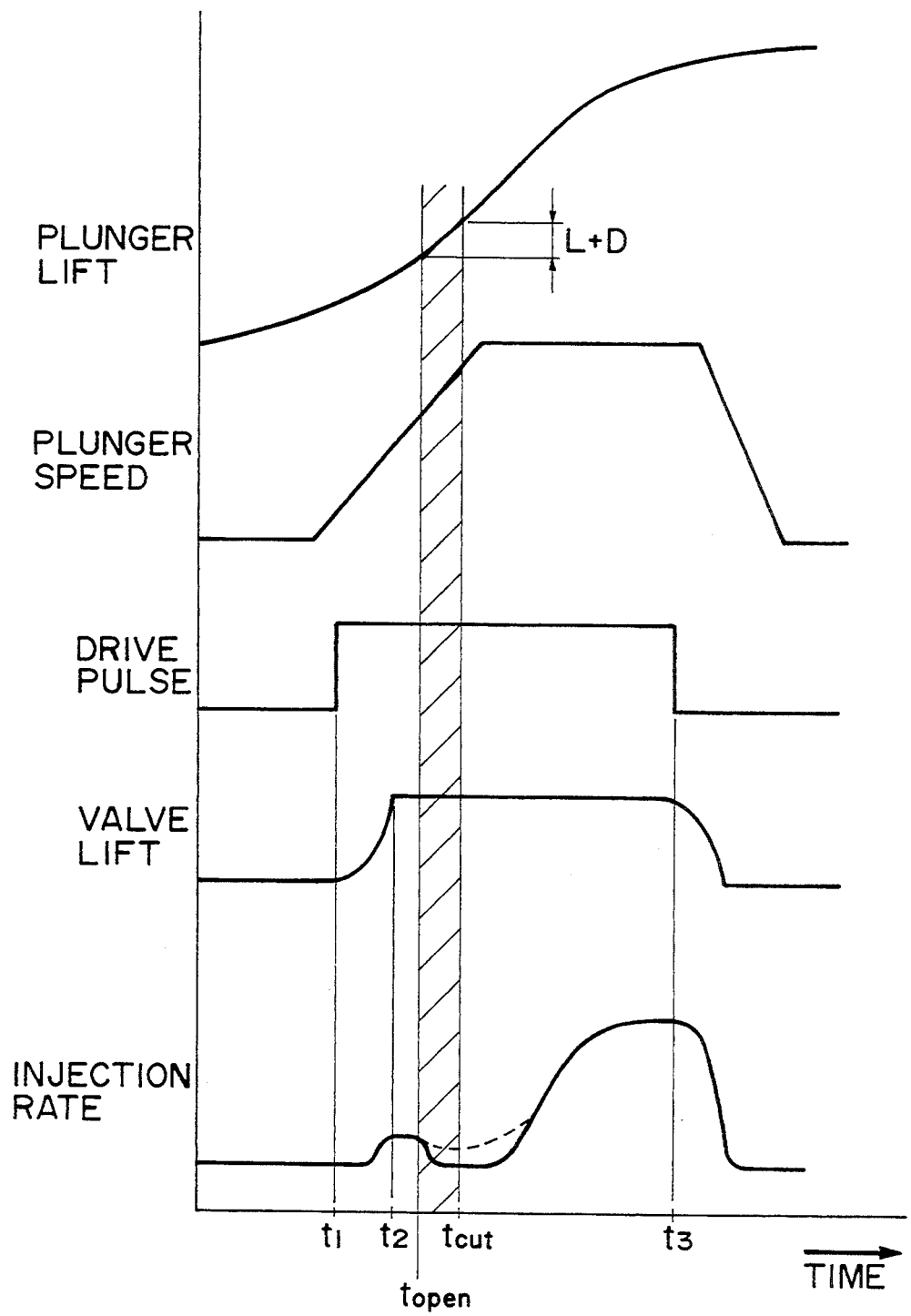

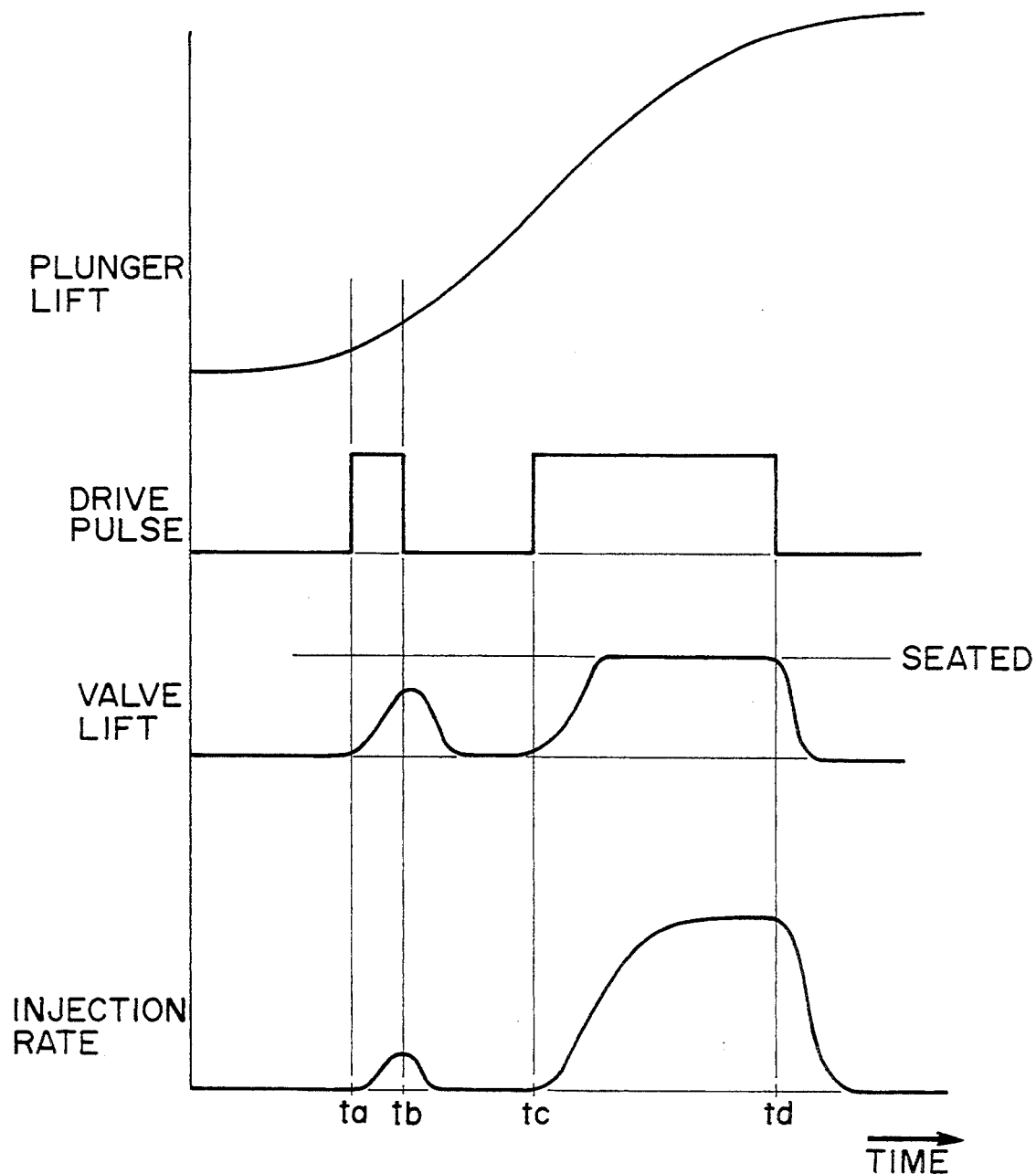

FUEL INJECTION SYSTEM

BACKGROUND OF THE INVENTION

1. Field of the Invention

The present invention relates to a fuel injection system in which a solenoid valve is provided in the middle of the fuel supply path leading to the compression space of a injection pump main body so that fuel injection to a engine is controlled by opening and closing a fuel supply path with this solenoid valve.

2. Description of the Related Art

Fuel injection pumps of this type in the known art include, for example, an invention disclosed in Japanese Unexamined Patent Publication 1-151751 in which a pilot injection is implemented prior to the main injection. In order to achieve the main injection and a pilot injection preceding the main injection, a solenoid valve is driven twice during the compression feed process.

To explain this, reference is made to the characteristics chart shown in FIG. 11 in this publication. The drive pulse supplied to the solenoid valve consists of a main pulse with a long interval and a sub pulse with a short interval. The small injection required to induce ignition of the fuel is achieved by supplying this sub pulse. Generally, the required quantity for a pilot injection is very small; approximately 3–5 mm$^3$/st per unit stroke of the plunger. During the restricting process of the fuel supply path, i.e. when the sub pulse restricts the fuel supply path, the solenoid valve is fully lifted (full valve lift), reaching the required quantity before it is seated. To counter this problem, it is designed in such a manner that the supply period of the sub pulse is shortened so that the solenoid valve returns before it is fully lifted.

Also, as shown in FIG. 1 in this publication, a structure in which a piezo element 47, for example, for opening and closing the injection nozzle 49 is provided in addition to the solenoid valve 7, a path 85 which communicates with the path 83 for fuel supply is provided in the housing 11 against which the plunger 23 slides and path 87 for fuel escape that communicates between this path 85 and a pressurized region 17 within a specific cam angle range is formed in the plunger 23.

However, since the solenoid valve receives the instruction to close and be reset before it is fully lifted, the degree of lift is not stable. Because of this, even though a pilot injection is employed to achieve good injection, the overall result is not good because the injection quantity fluctuates and is not stable. Moreover, with the pilot injection adjusted simply with the momentary lift of the solenoid, as in the prior art, when the rotation of the engine speeds up and the main injection quantity increases, the pilot injection also increases. Since, if the pilot injection is large, there may arise adverse effects such as an increase in smoke and the like, the pilot injection ideally should be small regardless of the rate of rotation of the engine.

As for the method in which an electromagnetic valve is driven twice, there is the problem of behavioral instability of the pilot injection and the main injection caused by the response delay of the solenoid valve and the like, resulting in a fluctuation of the injection quantity.

This problem seems to be solvable by applying the aforementioned technology in which a pilot injection is achieved by opening and closing with a piezo element or the like, to start and stop fuel injection promptly. In fact, however, as the plunger does not have a spin stopper, the phase between the plunger and the injection pump main body is not stable. For instance, as shown in FIGS. 12(a) and (b), if the phase between the leak port 52 formed in the injection pump main body 2, and the fuel escape path 43 formed in the plunger 5 changes, the length of the path from the compression space to the leak port and the path resistance also change, resulting in fluctuations in the pilot injection quantity. In this case, if the optimal injection characteristics are achieved in the state as shown in FIG. 12(a) and if the phase changes to the state shown in FIG. 12(b), fuel spill worsens due to the increase in the length of the path and the path resistance. In the worst case, as shown with broken lines in FIG. 8, the pilot injection and the main injection overlap, and stable injection characteristics cannot be achieved.

SUMMARY OF THE INVENTION

An objective of the present invention is to provide a fuel injection system in which a small quantity injection can be achieved in a stable manner prior to the main injection.

Another objective of the present invention is to achieve a steady, almost constant small quantity injection, regardless of the rotation rate of the engine.

Yet another objective of the present invention is to provide an injector unit in which stable injection characteristics can be achieved from the pilot injection through the main injection.

To achieve these objectives the present invention comprises a fuel injection pump provided with, as its minimum requirements, a compression space formed within a cylinder in which the plunger is inserted in such a manner that it slides freely; a high pressure path for inducing the fuel from the compression space to the nozzle; a fuel supply path for supplying the fuel that flows in from the fuel intake to the compression space; a solenoid valve located in the middle of the fuel supply path of the fuel injection pump, which has a plug valve for adjusting the state of communication between the compression space side and the fuel intake side in the fuel supply path and which controls the operation of the plug valve with an external control signal supplied to the solenoid; and a leak port that is formed on the side surface of the cylinder, which allows communication between the compression space and the fuel supply path in response to the lift of the plunger. The aforementioned external control signal that is supplied to the solenoid consists of a main pulse that constitutes the main injection and a sub pulse that constitutes a small quantity injection implemented prior to the main pulse. The sub pulse is set longer than the time required for the aforementioned plug valve to be lowered to the valve seat and, therefore, the compression space and fuel supply path communicate before the main injection.

In this structure, the fuel coming in from the fuel intake is further induced to the compression space via the solenoid valve, and even during the process of compression feed by the plunger, the fuel is not injected through the nozzle until the fuel supply path is restricted by the solenoid valve. When a sub pulse is generated in that portion of the cam travel range where a small quantity of injection is required, the plug valve of the solenoid valve is lifted to restrict the fuel supply path and consequently, the fuel within the compression space is pressurized and injected through the nozzle. After that, when the sub pulse ends, and the fuel supply path returns to the initial state, this preliminary injection is terminated and a main pulse is generated to restrict the fuel supply path again, but this time to start the main injection.

During the preliminary injection stage, which precedes the main injection, since the sub pulse is set longer than the time required for the plug valve to be lowered to the valve seat, the plug valve keeps traveling until it is seated in the valve seat. This means that the necessity to relift the plug valve just before it hits the valve seat is eliminated, thus making it possible to determine the movement of the plug valve uniformly. In this case, you might think that the quantity of preliminary injection would become too large. However, in combination with the movement of the plug valve, the compression space and fuel supply path come into communication via the leak port before the main injection, thereby suppressing any increase in the quantity of preliminary injection.

As a result, according to the present invention, by combining the time period during which the fuel inside the compression space is leaked via the leak port and the time period during which the fuel supply path is restricted by moving the plug valve until it is set in the valve seat, the pressurizing and leaking of the fuel inside the compression space are implemented simultaneously or with a specific phase offset, prior to the main injection, resulting in a stable movement of the plug valve and also achieving the optimum small quantity for preflow (preliminary injection).

Also, the present invention comprises a fuel injection pump unit, the minimum requirements of which are: a barrel section formed in the injection pump main body into which the plunger is inserted so that it slides freely, a compression space constituted by the space enclosed by the barrel section and the plunger, a high pressure path, to be explained later, for inducing the fuel from the compression space to the nozzle and a fuel supply path for supplying the fuel that flows in from the fuel intake to the compression space; a solenoid valve unit provided in the middle of the fuel supply path of the fuel injection pump main body, which has a plug valve for adjusting the state of communication between the compression space side and the fuel intake side in the fuel supply path and which controls the operation of the plug valve with an external control signal supplied to the solenoid; and a nozzle unit that supplies the fuel from the high pressure path to the engine. A leak port is formed on the side surface of the barrel section that communicates with the fuel supply path and a fuel escape path is formed in the plunger that communicates between the compression space and the leak port within a specific cam angle range. A drive pulse that closes the fuel supply path is supplied to the solenoid valve unit over and beyond the period in which the leak port and fuel escape path are in communication.

In this structure, the fuel coming in from the fuel intake is further induced to the compression space via the solenoid valve unit, but it is not injected through the nozzle until the fuel supply path is restricted by the solenoid valve unit. When the fuel supply path is restricted before the leak port and fuel escape path are in communication, the fuel within the compression space is pressurized to start pilot injection. When the plunger is lifted and the fuel escape path communicates with the leak port, the fuel inside the compression space is spilled into the fuel supply path to end the pilot injection. Then, with the plunger further lifted to disconnect the fuel escape path from the leak port, the fuel inside the compression space is pressurized again to start the main injection. This main injection ends when the fuel supply path opens.

Thus, the solenoid valve unit is operated only once over the period in which the leak port and fuel escape path are in communication, and by mechanically spilling the fuel in the compression space during that time, a fuel injection interruption interval is created between the pilot injection and main injection.

Consequently, since the operation of the solenoid valve unit during the compression feed process is performed only once and a temporary period is created during the stage when the fuel supply path is restricted to form separate injections in which the fuel inside the compression space is mechanically spilled to interrupt injection between the pilot and main, this system does not require the operation of the solenoid valve unit for interrupting the injection, and stable injection characteristics can be achieved for each cycle.

Moreover, since the pilot injection quantity can be varied with the timing with which the power supply to the solenoid valve unit starts, and the main injection quantity can be varied depending upon the timing with which the power supply to the solenoid valve unit ends, an optimal injection for the operating state of the engine, including offset for each cylinder, can be provided. Also, if the power supply start timing is set after the period in which the leak port and fuel escape path are in communication, the pilot injection can be eliminated altogether.

Furthermore, if the solenoid valve unit is operated twice in the compression feed process, as in the prior art, high responsiveness is required for the solenoid valve unit in order to stabilize the behavior of the interruption between the pilot injection and the main injection. In the present invention, since the plug valve is not required to operate during the process in which the operation shifts from the pilot injection to the main injection, the responsiveness of the solenoid valve unit is not a crucial issue and it is possible to use an inexpensive, compact solenoid valve unit.

In addition, even if the position at which the leak port is formed varies for each injector unit, by adjusting the cam angle at which the leak port and the fuel escape path are in communication with a shim or the like, the injection start and injection quantity can be set at the desired time and amount with only an adjustment of the timing with which power is supplied to the solenoid valve unit. This provides another advantage, in that strict precision is not required for the formation of the leak port, the fuel escape path and the like.

The present invention also comprises a fuel injection pump unit, the minimum requirements of which are a barrel section formed in the injection pump main body into which the plunger is inserted so that it slides freely, a compression space provided in the space enclosed by the barrel section and the plunger, a high pressure path for inducing the fuel inside the compression space to the nozzle (to be explained later), a fuel supply path for supplying the fuel that flows in from the fuel intake to the compression space, a solenoid valve unit provided in the middle of the fuel supply path of the fuel injection pump main body, which has a plug valve for adjusting the state of communication between the compression space side and the fuel intake side in the fuel supply path and which controls the operation of the plug valve by an external control signal supplied to the solenoid, and a nozzle unit that supplies the fuel from the high pressure path to the engine. A leak port is formed on the side surface of the barrel section, which communicates with the fuel supply path, and a fuel escape path is formed in the plunger, which communicates between the compression space and the leak port within a specific cam angle range. A phase fixing mechanism that fixes the phase between the plunger and the injection pump main body is provided in the injection pump main body.

With this structure, as the phase between the plunger and the injection pump main body is fixed, the risk of the plunger rotating as it makes a reciprocal motion is eliminated and the spill characteristics of the fuel spilling from the compression space to the fuel supply path can be made constant, achieving the objectives described above.

Therefore, since the phase between the plunger and injection pump main body is fixed and the spill characteristics of the fuel spilling from the compression space to the fuel supply path can be maintained constant, no deviation in the injection characteristics occurs over time with the rotation of the plunger, resulting in the achievement of stable injection characteristics for each cycle.

BRIEF DESCRIPTION OF THE DRAWINGS

Many other advantages, features and objectives of the present invention will be understood by those of ordinary skill in the art in referring to the attached drawings which illustrate preferred embodiments of the present invention, and in which:

FIG. 1 is a cross section showing a schematic structure of a fuel injection system according to the present invention;

FIGS. 5(a) through (c) are enlarged cross sections of essential parts of yet another embodiment of the present invention;

FIG. 6 is a chart showing the characteristics of plunger lift, drive pulse, valve lift and injection rate of the fuel injection system in the embodiment shown in FIG. 5;

FIGS. 7(a) through (c) are enlarged cross sections of essential parts of the fuel injection system in FIG. 1 and show the process in which the plunger is lifted;

FIG. 8 is a chart showing the characteristics of plunger lift, plunger speed, drive pulse, valve lift and injection rate of the fuel injection system in the embodiment shown in FIG. 7;

FIG. 11 is a chart of prior art system showing the characteristics of plunger lift, drive pulse, valve lift and injection rate.

DETAILED DESCRIPTION OF THE PREFERRED EMBODIMENTS

Figure 2A:
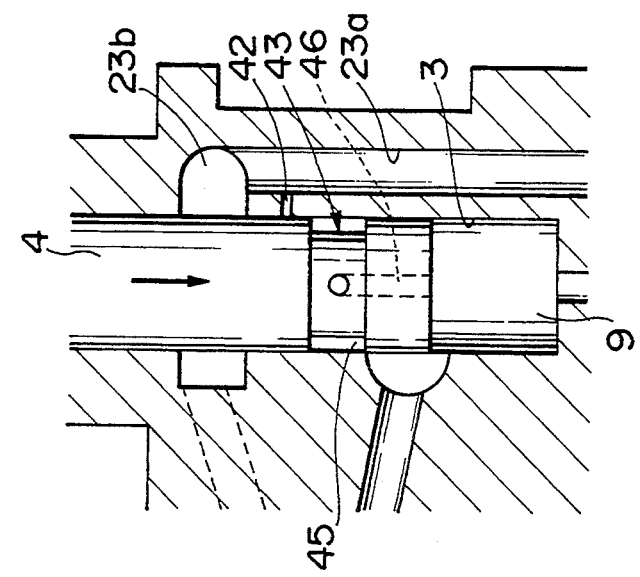
FIGS. 2(a) through (c) are enlarged cross sections of the essential parts of fuel injection system in FIG. 1.

The following is an explanation of the embodiments of the present invention with reference to the drawings.

In FIG. 1, the fuel injection system is provided with a injector unit type injection pump unit 1 which injects and supplies fuel into the cylinders of, for example, a diesel engine. This injection pump unit 1 is provided with a barrel 3 at the base of an injection pump main body 2 and a plunger 4 inserted in the barrel 3 in such a manner that it slides freely. A spring bearing section 2a is formed on the injection pump main body 2 and a spring 6 is provided between the spring bearing section 2a of the injection pump main body 2 and a tappet 5 that is linked to the plunger 4. The spring 6 constantly applies force in the direction in which the plunger 4 moves further away from the injection pump main body 2 (the direction indicated with arrow A in the figure). The tappet 5 is mounted on the injection pump main body 2 with a connecting pin 8 inserted in it, and this connecting pin 8 projects out from a side surface into guide groove 7 which is formed along the direction of the axis of the plunger 4 in the injection pump main body 2 so that it can make reciprocal movement while maintaining a specific phase in relation to the injection pump main body 2. A cam that is formed on a drive shaft (not shown) is in contact with the tappet 5 and the drive shaft, which is linked to the engine, rotates. The drive shaft and cam work together with the aforementioned spring 6 to cause the reciprocal movement of the plunger 4 within the barrel 3. With this reciprocal movement of the plunger 4, the fuel inside a compression space 9, which is an enclosure formed by the plunger 4 and the injection pump main body 2, is compressed, and, with the same movement, fuel is drawn into the compression space 9.

A holder unit 10 is mounted on the tip of the injection pump main body 2 by a holder nut 11 that is connected to the holder unit 10 around the tip of the injection pump main body 2. A nozzle unit 13 is mounted to the holder unit 10 via a spacer 12. The spacer 12 and nozzle unit 13 are secured by entwining a retainer nut 14 that is connected to these parts around the tip of the holder unit 10. The holder unit 10 is provided with a spring housing 15 and with a nozzle spring 16 housed in the spring housing 15. A needle valve (not shown) in the nozzle unit is pressed in the direction of the tip of the nozzle unit (the direction indicated with arrow B in the figure). The structure of the nozzle unit 13 is of the type known in art, and when fuel at high pressure is supplied through a high pressure path 17, to be explained later, the needle valve is opened in resistance against the nozzle spring 16 and the fuel is injected through an injection hole formed at the tip of the nozzle unit into the engine.

The high pressure path 17 consists of a path 18 formed in the injection pump main body 2, one end of which opens into the compression space 9, a path 19 that communicates with the path 18 and is formed in the holder unit 10, a path 20 formed in the spacer 12 that communicates with the path 19 and a path (not shown) formed in the nozzle unit 13 that communicates with the path 20.

A valve housing 22 for accommodating a solenoid valve unit 21, to be explained later, is provided extending at the side of the injection pump main body 2 as an integrated unit with the valve housing 22. A fuel supply path 23 is provided in the injection pump main body 2 and a valve housing 22 for supplying a fuel to the compression space 9. This fuel supply path 23 comprises a first supply path 23a, formed at a side of the injection pump main body 2 and through which the fuel from a fuel intake 24 is supplied, a loop basin 23b that is connected to the first supply path 23a and is formed at a part of the barrel 3 against which the plunger 4 makes a constant sliding motion, a second supply path 23c that is connected to the loop basin 23b and communicates with the valve head housing chamber 25 in the solenoid valve unit 21, and a third fuel supply path 23d, one end of which is connected to the circular groove 27 that is formed on the surface of a plug valve 26, the other end of which is connected to the aforementioned compression space 9.

Fuel supply to the compression space 9 is controlled by the solenoid valve unit 21, and this solenoid valve unit 21 is provided with the plug valve 26 that is inserted through a sliding hole 28 formed in the valve housing 22 in such a manner that it can slide freely. In the valve housing 22 a valve seat 30 is provided in contact with a valve head 29 that is formed at the tip of the plug valve 26, and a header 31 is secured with a screw to the valve housing 22 in such a manner that it surrounds the valve head 29. At the connecting section of the header 31 and the valve housing 22, a valve head housing chamber 25 is formed by the header 31 and the valve housing 22. A stopper 32 that is secured to the header 31 and faces opposite the valve head 29 is provided in the valve head housing chamber 25.

The plug valve 26 passes though a holder 33 which is secured by a screw on the other side of the header 31 in the valve housing 22 and an armature 34 secured at its tip. A solenoid housing section 36 is attached by a holder nut 37 on to the holder 33 via the spacer 35, and the aforementioned armature 34 is housed inside a armature chamber 38 which is formed between the holder 33 and the spacer 35, with the armature 34 facing opposite a solenoid 39 housed in the solenoid housing section 36 via a mounting hole in the spacer 35. A spring 40 is housed and held in the holder 33 for applying a constant force to the valve head 29 in the direction in which it moves away from the valve seat 30 so that, in the normal state, the valve head 29 is away from the valve seat 30, and when the armature 34 is pulled toward the solenoid 39, with power supplied to the solenoid 39, the valve head 29 is driven in the direction in which it comes in contact with the valve seat 30.

Thus, the aforementioned plug valve housing chamber 25 is always supplied and filled with fuel via the first supply path 23a, the loop basin 23b and the second fuel supply path 23c, and when the valve head 29 leaves the valve seat 30 during the intake operation of the plunger 4, the fuel filling the plug valve housing chamber 25 travels through the gap between the plug valve 26 and the sliding hole 28 to the circular groove 27. Then it travels from the circular groove 27 through the third fuel supply path 23d to be supplied to the compression space 9. The fuel pressure at this point is approximately 5 Kg/cm$^2$.

In this manner, while power is supplied to the solenoid 39, the valve head 29 sits on the valve seat 30 to cut off the fuel supply path 23 and fuel that has already been supplied to the compression space 9 is compressed during the compression feed process by the plunger 4 and is supplied to the nozzle unit 13 via the high pressure path 17. This compression feed of fuel is terminated when the power supply to the solenoid 39 stops, the valve head 29 leaves the valve seat 30 and part of the high-pressure fuel at the high pressure side (the high pressure path, the compression space, the third fuel supply path) is delivered back to the valve head housing chamber 25 and the fuel pressure in the compression space 9 is reduced.

Figure 2B:
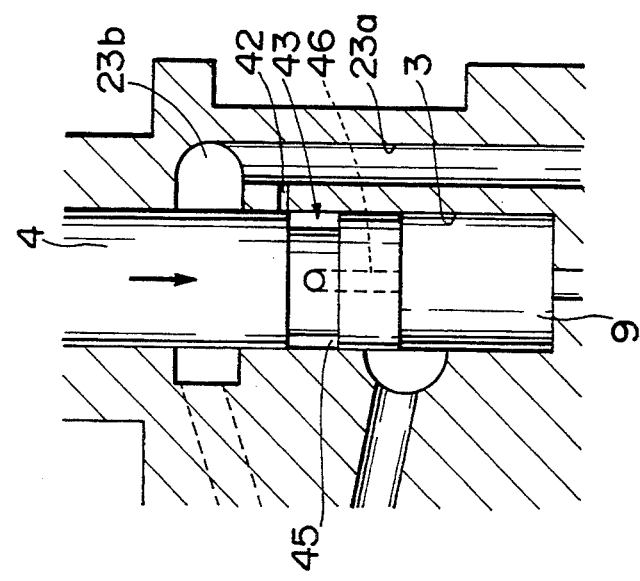
Figure 2C:
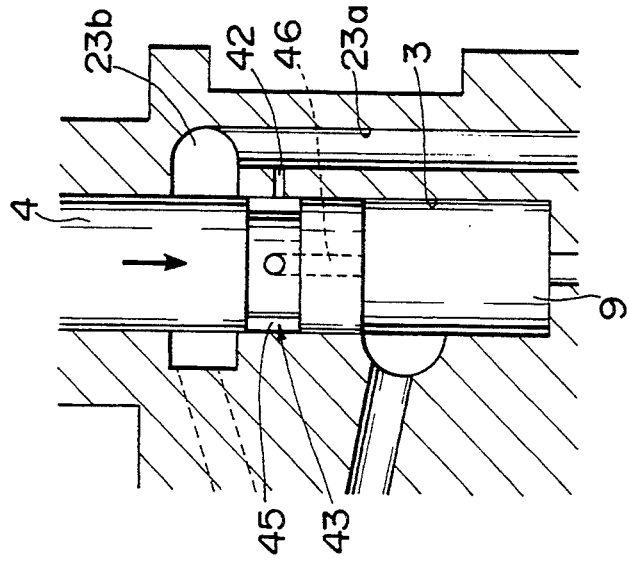

As shown in FIGS. 2(a)–(c), a fuel escape path 43 is formed on a side section of the plunger 4 toward the compression space in relation to the loop basin 23b, and this escape path 43 is formed with a circular groove 45 formed on the side surface of plunger 4 and a communicating hole, one end of which is connected to the circular groove 45, the other end of which communicates with the compression space 9. Also, a leak port 42 is provided on a side section of the barrel 3, one end of which opens into the first supply path 23a and the other end of which opens into the barrel. The relationship between the leak port 42 and the aforementioned circular groove 45 is as described below.

FIG. 2(a) shows the plunger at bottom dead center, from which point it travels to the uppermost point in FIG. 1. At this point, the leak port 42 is already open to the circular groove 45. When, during the initial stage of the move, the plunger 4 travels downwards in the figure (the direction of the arrow in FIG. 2) the position of the leak port 42 that faces the circular groove 45 travels upwards relative to the circular groove 45, and when the plunger 4 reaches the position shown in FIG. 2(b) the circular groove 45 is cut off from the leak port 42 to terminate communication with the leak port 42. The time period starting from at the bottom dead center position until the communication between the leak port 42 and circular groove 45 is cut off, is designated as t cut. Following t cut, the plunger is further lifted to reduce the volumetric capacity of the compression space 9 without the leak port 42 and circular groove 45 resuming communication (FIG. 2(c)).

In relation to the movement of the plunger 4, wherein the leak port 42 and the circular groove 45 maintain the relationship described above, the power supply to the aforementioned solenoid 39 is controlled by the control unit 48 shown in FIG. 1. This control unit 48 consists of an A/D converter, a multiplexer, a microcomputer and a drive circuit, etc., not shown in the figure. Various signals from units such as an accelerator operation detection unit that detects the amount of travel on the accelerator pedal (throttle opening), the rotation detection unit that detects the rotation rate of the engine, a reference pulse generating unit that is mounted to the drive shaft and which generates a pulse every time the drive shaft passes a reference angle position and the like, are input to the control unit 48, which outputs the drive pulse shown in FIG. 3.

This drive pulse is supplied to the solenoid 39 in the solenoid valve unit 21 and it contains a sub pulse for performing a small quantity injection (or pilot injection) over a short interval of t1–t2 during the initial stage of the lift prior to the main pulse for performing the main injection over the interval t3–t4 when the plunger 4 is lifted from bottom dead center (t=0). The pulse width (t2–t1) of this sub pulse is longer than the time period starting when the plug valve 26, which is fully open, moves against the spring 40 until the time when it is seated on the valve seat 30. Also, the interval between the sub pulse and the main pulse is longer than the time elapsing between the time when the plug valve 26 is seated and the time when it returns to its initial full open state. The aforementioned t cut is set to occur after the valve is open again following the generation of the sub pulse and before t3 when the main pulse in generated.

In the structure described above, assume that the plunger 4 is currently at the bottom dead center position. At this point, the plunger starts to lift and at t1, when the sub pulse is supplied to the solenoid 39, the armature 34 is pulled toward the solenoid 39 by electromagnetic force and the valve head 29 starts to move toward the valve seat 30. Shortly after this, following t1, the valve head 29 is seated on the valve seat 30. This seated state lasts until t2. Then after t2, as the electromagnetic force is no longer present, the valve head 29 is separated from the valve seat 30 at a speed determined by the force of the spring 40.

Figure 3:
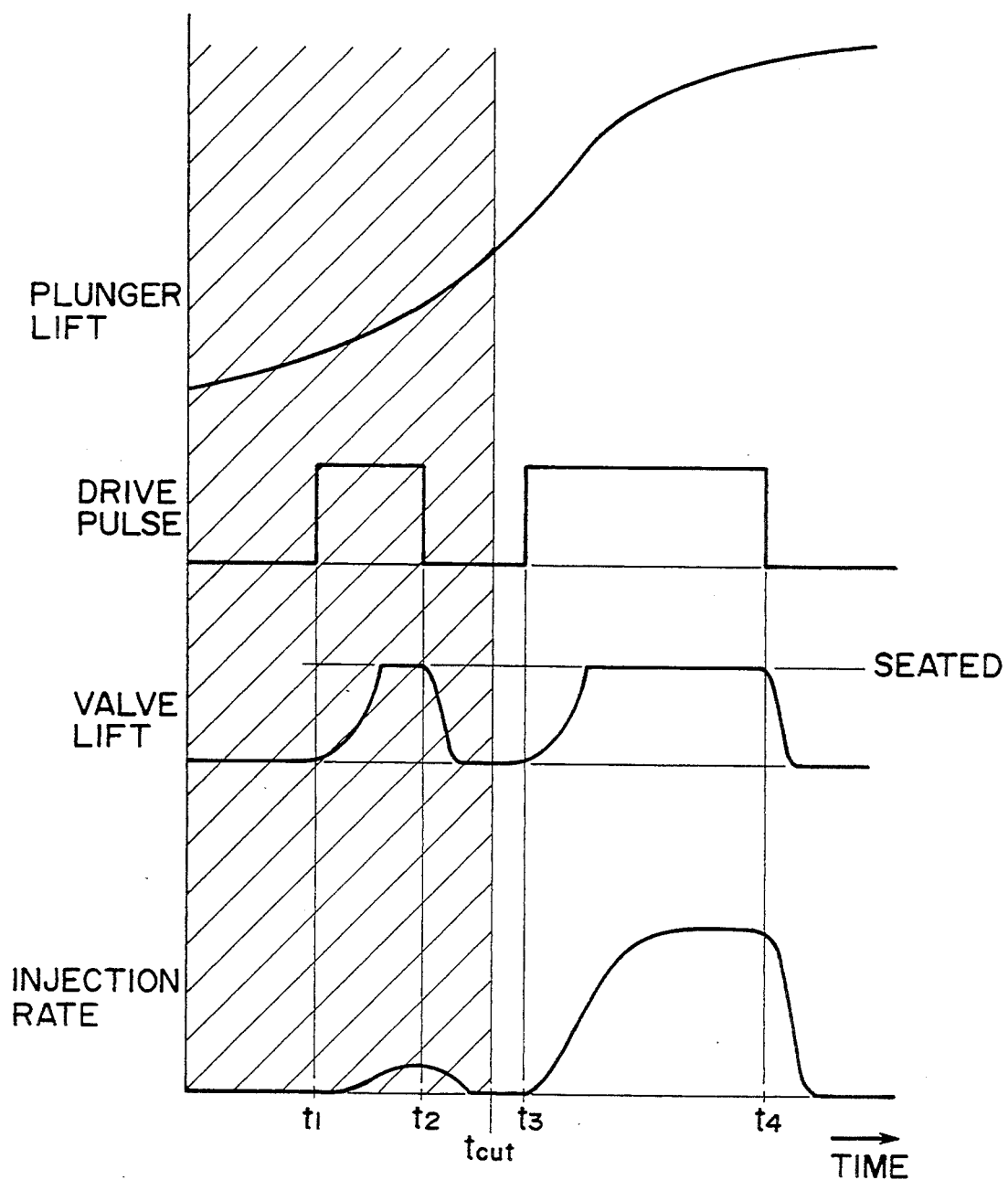
FIG. 3 is a chart showing the characteristics of plunger lift, drive pulse, valve lift and injection rate of the fuel injection system in FIG. 1.

During this process, as the fuel supply path 23 is restricted by the solenoid valve unit 21, the fuel inside the compression space 9 is compressed by the plunger 4 and injected before the plug valve 26 is fully opened. Since this pre-flow is only for inducing the ignition of the main injection, a very small quantity is required and, therefore, if lifting lasts until the plug valve 26 is seated, the injection quantity would ordinarily exceed the required amount. However, since during this pre-flow interval the leak port 42 and circular groove 45 are in communication and consequently part of the fuel inside the compression space is returned to the fuel supply path 23 via the communicating hole 46, the circular groove 45 and the leak port 42, the amount of fuel injected from the nozzle does not increase. On the contrary, as shown in FIG. 3, it achieves a small injection rate. The diameter of the leak port 42 is predetermined to achieve such an optimal pre-flow at a small quantity. Moreover, as the plug valve 26 is seated on the valve seat 30 at some point, the movement of the plug valve 26 can be determined uniformly to eliminate fluctuation in the injection rate. In addition, although the pulse width of the drive pulse is set longer than what is necessary for the plug valve 26 to be seated, injection is performed over a longer interval than in the known art, with the leak port 42 present, injection rate characteristics that show a gentle upwards overall profile can be achieved to smoothly induce the ignition of the main injection.

When the pre-flow ends and the operation is at t cut, communication between the leak port 42 and the circular groove 45 is cut off. After this, there is no more leak function in effect for the fuel and a main injection similar to that in the known art is performed. In other words, following t3, when the drive pulse is generated, the plug valve 26 is seated on the valve seat 30 again and the fuel inside the compression space is injected through the nozzle due to the compression from the plunger 4 without any leakage. Thus, the injection rate is increased and this state is maintained until t4, at which point, the plug valve 26 leaves the valve seat 30.

Figure 4A:
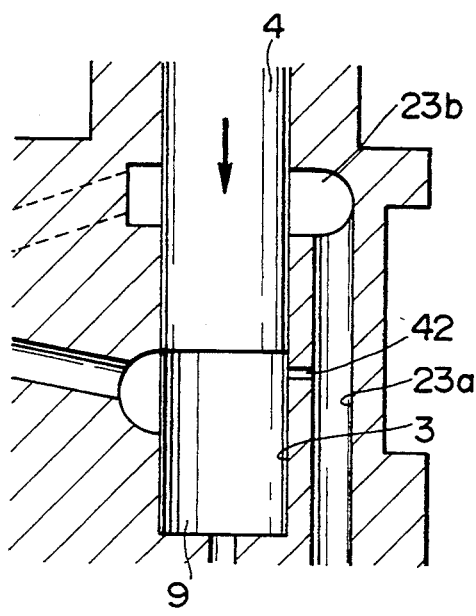
FIGS. 4(a) and (b) are enlarged cross sections of essential parts of another embodiment of the present invention.
Figure 4B:
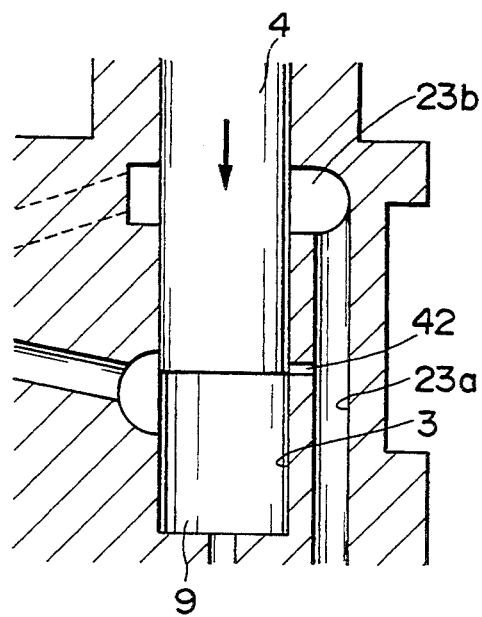

It should be noted that in the structure described above, the circular groove 45 in the plunger 4 and the leak port 42 always faces the side surface of the plunger 4. As shown in FIG. 4, however, it is possible to achieve similar advantages with a structure in which the leak port 42 is formed so that it faces the compression space 9 during the initial stage of the plunger lift (FIG. 4(a)) and the leak port 42 is closed off by the tip of the plunger 4 at t cut (FIG. 4(b)).

FIG. 5 shows another embodiment of the present invention. Since its basic structure is similar to that of the first embodiment, its explanation is omitted. The relationship between the leak port 42 and the circular groove 45 of the fuel escape path 43 is described below.

In the state in which the plunger 4 is at bottom dead center, the leak port 42 is facing the side wall of the plunger 4 toward the tip in relation to the circular groove 45 and the leak port 42 and the circular groove 45 are not in communication (FIG. 5(a)). When the plunger 4 travels downward in the figure (in the direction of the arrow) from this state, the leak port 42 travels upward relative to the circular groove 45 during the initial stage of the move and the circular groove 45 communicates with the leak port 42 when the plunger 4 reaches the position shown in FIG. 5 (b). When the plunger travels further to reach the position shown in FIG. 5(c) the circular groove 45 is cut off from the leak port 42, cutting off communication with the leak port 42. The time starting from bottom dead center until the leak port 42 and the circular groove 45 come into communication with each other is designated as t open. And the time up to the point when communication between the leak port 42 and circular groove 45 is cut off is designated t cut.

Following t cut, the plunger is further lifted to reduce the volumetric capacity of the compression space 9 without the leak port 42 and the circular groove 45 resuming communication.

In relation to the movement of the plunger 4, wherein the leak port 42 and the circular groove 45 maintain the relationship described above, the power supply to the aforementioned solenoid 39 is performed as shown in FIG. 6.

In summary, the drive pulse that is supplied to the solenoid 39 contains a sub pulse for performing a small quantity injection (or pilot injection) over a short interval of t1-t2 during the initial stage of lift prior to the main pulse for performing the main injection over the interval t3-t4 when the plunger 4 is lifted from the bottom dead center (t=0). The pulse width of this sub pulse is longer than the time period starting when the plug valve 26, which is fully open, moves against the force of the spring 40 until the time when it is seated on the valve seat 30. Also, the interval between the sub pulse and the main pulse is longer than the elapsed time between the state in which the plug valve 26 is seated and the time when it returns to its initial open state. The aforementioned t open is set so that it will occur after the sub pulse is generated and, in this embodiment, the plug valve is seated on the valve seat. In actuality, it is set at a point appropriate to inhibit an excessive increase of pre-flow. This means that it is not necessarily imperative to set it in accordance with the end timing of the sub pulse or the timing with which the plug valve is seated. Rather, it should be determined by experiment, taking into consideration the leaking state of the fuel and the like. The aforementioned t cut is set to occur before t3, when the main pulse is generated.

In the structure described above, assume that the plunger 4 is currently at the bottom dead center position. At this point, the plunger starts to lift and at t1, when the sub pulse is supplied to the solenoid 39, the armature 34 is pulled toward the stator by electromagnetic force and the valve head 29 starts to move toward the valve seat 30. Shortly after this, following t1, the valve head 29 is seated on the valve seat 30. This seated state lasts until t2. Then, after t2, since the electromagnetic force is no longer present, the valve head 29 is separated from the valve seat 30 at a speed determined by the force of the spring 40.

During this process, as the fuel supply path 23 is restricted by the solenoid valve unit 21, the fuel inside the compression space 9 is compressed by the plunger 4 and injected before the plug valve 26 is fully opened. However, during this pre-flow period, before the pre-flow becomes excessive, the leak port 42 comes into communication with the circular groove 45 to allow a portion of the fuel in the compression space 9 to be returned to the fuel supply path 23 via the communicating hole 46, the circular groove 45 and the leak port 42. As a result, the fuel injected through the nozzle does not increase and the small injection rate can be achieved as shown in FIG. 6, regardless of the rotation rate of the engine.

In this embodiment too, the plug valve 26 is moved until it is seated on the valve seat 30. Therefore, the movement of the plug valve can be determined uniformly, eliminating fluctuation in the injection rate.

When the pre-flow ends and the operation is at t cut, communication between the leak port 42 and the circular groove 45 is cut off. After this, there is no more leak function in effect for the fuel, and a main injection similar to that in the known art is performed. In other words, following t3, when the drive pulse is generated, the plug valve 26 is seated on the valve seat 30 again and the fuel inside the compression space 9 is injected through the nozzle due to the compression from the plunger 4 without any leakage. Thus, the injection rate is increased and this state is maintained until t4, at which point, the plug valve 26 leaves the valve seat 30.

Another embodiment of the present invention is now described. As shown in FIGS. 7(a) through (c), the leak port 42 which communicates with the first supply path 23a is formed on the side surface of the barrel toward the compression space relative to the loop basin 23b, and a fuel escape path 43 that communicates with the compression space 9 is formed in the plunger 4. The fuel escape path 43 is comprised of the circular groove 45 that is formed in a circular path on the circumferential surface of the plunger 4 and a communicating path 46 that consists of a longitudinal conduit that runs in the direction of the axis of the plunger from the tip of the plunger that faces the compression space 9 and a transverse conduit which is formed in the direction of the diameter of the plunger 4 starting from the longitudinal conduit and which communicates with the circular groove 45. The positional relationship between the leak port 42 and circular groove 45 of the fuel escape path 43 is as described below.

In the state in which the plunger 4 is positioned at bottom dead center, the leak port 42 is at a position toward the tip of the plunger 4 relative to the circular groove 45, the leak port 42 is closed off by the side surface of the plunger 4 and is, therefore, not in communication with the circular groove 45 (FIG. 7(a)). The stroke (cam angle) from bottom dead center until the time when the leak port 42 communicates with the circular groove 45 is set at a specific value in advance with a shim provided between the tappet 5 and the cam. Thus, when the plunger 4 travels downward in the figure (in the direction of the arrow in FIG. 7), the distance between the circular groove 45 and the leak port 42 is reduced, and when the plunger 4 has traveled a specific stroke, the circular groove 45 comes into communication with the leak port 42 (FIG. 7(b)). When the plunger 4 travels further down and the circular groove 45 is separated from the leak port 42, communication between them is cut off (FIG. 7(c)). The point in time when the leak port 42 and circular groove 45 come into communication is designated as t open and the point in time when the communication between the leak port 42 and circular groove 45 is cut off is designated as t cut. Thus, t cut is the point in time when the plunger has been lifted from the t open position by a distance equal to the total of the diameter (D) of the leak port 42 and the width (L) of the circular groove 45 (refer to FIG. 8). After t cut, the plunger 4 is lifted further and the circular groove 45 moves further away from the leak port 42 until the plunger 4 reaches top dead center.

In relation to the movement of the plunger 4, wherein the leak port 42 and circular groove 45 maintain the relationship described above, the power supply to the aforementioned solenoid 39 is controlled by the control unit 48 shown in FIG. 1. This control unit 48 outputs the drive pulse shown in FIG. 8.

This drive pulse is supplied starting at the point in time (t1) before the circular groove 45 and the leak port 42 come into communication during the initial stage of the compression feed process, in anticipation of a response delay at the solenoid 39, and the drive pulse is cleared at the point (t3) when a specific length of time has elapsed after the plunger 4 is lifted and the circular groove 45 passes through the leak port 42.

The point at which the drive pulse is supplied is adjusted as appropriate in order to achieve an optimal pilot injection quantity and in this embodiment, as shown in FIG. 8, the time (t2) when the plug valve 26 is seated on the valve seat 30 is set to occur before t open. However, the seating timing (t2) may be shifted to a point in time during the period in which the circular groove 45 is in communication with the leak port 42 or to a point in time after that. In either case, it is possible to achieve a pilot injection with the pre-flow that is generated during the process in which the fuel supply path 23 is restricted.

In the structure described above, assume that the plunger 4 is currently at the bottom dead center position. At this point, the plunger starts to lift and at t1, when the drive pulse is supplied to the solenoid 39, the armature 34 is pulled toward the solenoid 39 by electromagnetic force and the valve head 29 starts to move toward the valve seat 30. Shortly after this, following t1, the valve head 29 is seated on the valve seat 30 at t2. This seated state lasts until t3. Then after t3, since the electromagnetic force is no longer present, the valve head 29 is separated from the valve seat 30 at a speed determined by the force of the spring 40.

Before t open, since the fuel supply path 23 is restricted by the solenoid valve unit 21, the fuel in the compression space 9 is compressed by the plunger and injected to start the pilot injection. After t open, when the leak port 42 and the circular groove 45 are in communication with each other, a portion of the fuel in the compression space is returned to the fuel supply path 23, reducing the pressure in the compression space to end the pilot injection. Following t cut, the communication between the leak port 42 and the circular groove 45 is cut off and, therefore, the leak function is not in effect for the fuel and a main injection similar to that in the known art is achieved. This state is maintained until t3.

As has been explained above, since, in the present invention, the solenoid valve unit 21 is operated only once during the compression feed process and the leak port 42 and the fuel escape path 43 are in communication with each other during the operation of the solenoid valve unit 21, the pilot injection and the main injection can be achieved while the movement of the plug valve 26 is maintained stable.

The linking of the plunger 4 and the tappet 5 is implemented by connecting the base portion of the plunger 4 to the tip of the tappet 5. In other words, a U-shaped basin 51, which opens on the side and also opens at the tip via a somewhat narrowed opening portion 50 is formed at the tip of the tappet 5 and a small diameter section 52, which has approximately same diameter as the width for the narrow opening section 50, is provided at the base of the plunger 4. A linking projection 53 with a larger diameter than that of the small diameter section 52 is provided in continuation with the small diameter section 52. The connection is accomplished in this structure by sliding this linking projection 53 toward the U-shaped basin 51 from the side.

Figure 9:
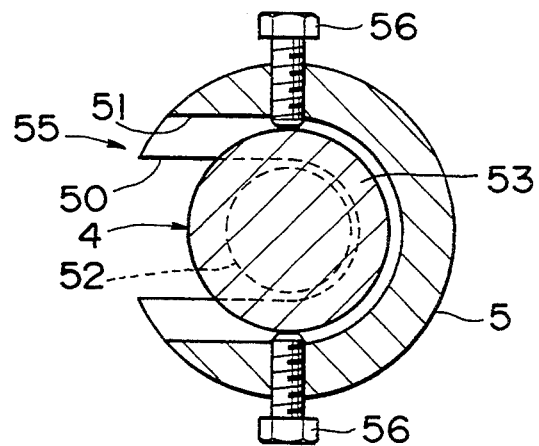
FIG. 9 shows an example of a cross section across line C—C in FIG. 1.
Figure 10:
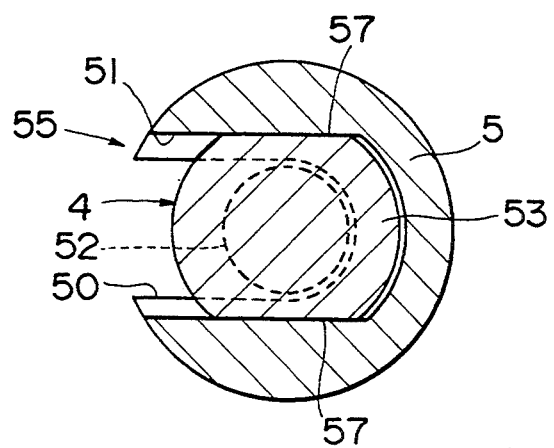
FIG. 10 shows another example of a cross section across line C—C in FIG. 1.
Figure 12A:
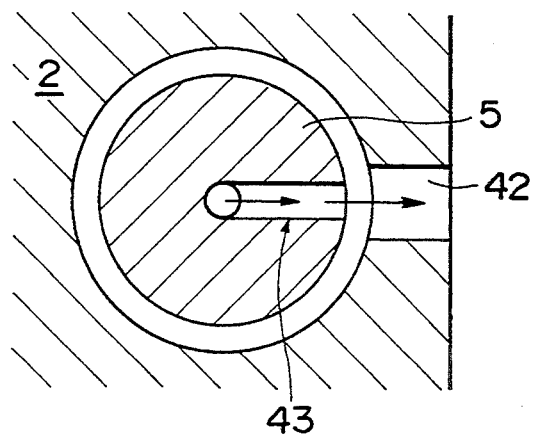
FIGS. 12(a) and (b) are explanatory drawings of the phase change between the leak port formed in the injection pump main body and the fuel escape path formed in the plunger in a prior art system.
Figure 12B:
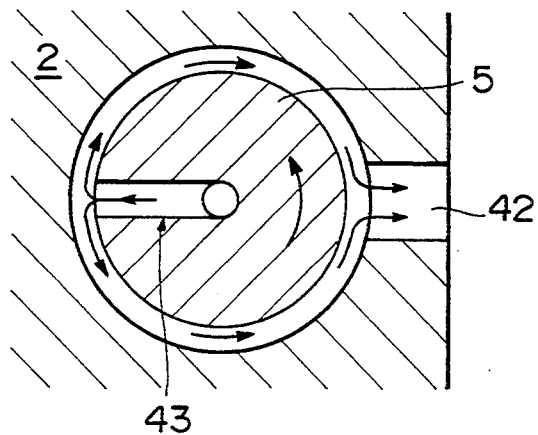

The phase between the plunger 4 and the injection pump main body 2, that is, the phase between the fuel escape path 43 and the leak port 42, is secured by a phase fixing mechanism 55, which may take the form shown in FIG. 9, for example, in which adjusting set screws 56 are pierced through the side wall of the tappet 5 in the direction of the diameter. With these adjusting set screws 56, the linking projection 53 is tightened in the direction of the diameter so that the plunger 4 will not rotate. The phase fixing medium 55 may also take the form shown in FIG. 10, in which a flat area 57 which is in contact with the wall surface that faces opposite the U-shaped basin 51 is provided in the linking projection 53 of the plunger 4 to prevent the plunger 4 from rotating. Moreover, this mechanism may take the form in which a plurality of flat areas 57 are provided along the circumferential edge of the linking projection 53 making it polygonal, so that the phase between the plunger 4 and the injection pump main body 2 can be adjusted and fixed at a phase that allows an optimal spill state.

With such a phase fixing mechanism 55 provided, the phase between the fuel escape path 43 and the leak port 42 does not deviate every time the fuel escape path 43 comes into communication with the leak port 42 and consequently the length of the path from the compression space 9 to the leak port 42 and the path resistance can be maintained at constant values. As a result, the leaking state of the fuel can be maintained consistent throughout the operation to eliminate any fluctuation of the injection characteristics.

Also, with the present invention, even if the positions at which the leak port 42 and the circular groove 45 are formed are not consistent, if the cam angle at which the circular groove 45 opens onto the leak port 42 is adjusted with a shim or the like and the start point at which the drive pulse is supplied is adjusted by the solenoid valve unit 21, the injection performance can be set at an optimal state for each injector unit. In other words, with the inline pumps and VE pumps in the prior art, it is necessary to form various members and paths within a specific range of allowances, as the injection characteristics change if the prestroke is changed with adjustments of shim thickness. With the present invention, on the other hand, since even if a deviation in the position of the leak port and the like is adjusted with a shim, the injection start can be controlled with the electromagnetic valve and both the injection start and the injection quantity can be determined uniformly relative to the cam angle. Therefore, with the injector unit according to the present invention, changing the thickness of the shim in order to achieve the desired injection characteristics does not present any problems. It is of no consequence if the positions at which the leak port and the like are formed are inconsistent and require an increase in the thickness of the shim.

What is claimed is:

1. A fuel injection system, comprising:
an injection pump unit comprising an injection pump main body having a barrel formed therein, a plunger inserted into said barrel such that said plunger slides freely therein, a compression space in a region enclosed by said barrel and said plunger, a high pressure path for conducting fuel from said compression space and a fuel supply path for supplying fuel from a fuel intake to said compression space;
a solenoid valve unit located in said fuel supply path of said fuel injection pump unit, said solenoid valve unit comprising a plug valve and a valve seat for adjusting the state of communication between a compression space side of said fuel supply path and a fuel intake side of said fuel supply path and a solenoid for operating said plug valve, the operation of said plug valve being controlled by an external control signal supplied to said solenoid;
a nozzle unit connected with said high pressure path for supplying fuel from said high pressure path to an engine; and
a leaking means for allowing communication between said compression space and said fuel supply path in correspondence with the state of said plunger, wherein said external control signal supplied to said solenoid comprises a main pulse that corresponds to a main injection and a sub pulse that corresponds to a small quantity injection that occurs prior to said main pulse, wherein the pulse width of said sub pulse is set longer than the time required for said plug valve to become seated on said valve seat and communication between said compression space and said fuel supply path is cut off after said sub pulse is generated and before said main pulse is generated.

2. The fuel injection system according to claim 1, wherein
said leaking means that allows communication between said compression space and said fuel supply path comprises:
a leak port formed in said injection pump main body, one end of which opens into said fuel supply path and the other end of which opens into said barrel, and
a fuel escape path formed in said plunger, one end of which opens onto a side surface of said plunger and the other end of which opens into said compression space.

3. The fuel injection system according to claim 1, wherein:
said leaking means that allows communication between said compression space and said fuel supply path is constituted by a leak port formed in said injection pump main body, one end of which opens into said fuel supply path and the other end of which opens into said barrel.

4. The fuel injection system according to claim 1, wherein:
said compression space and said fuel supply path are in communication with each other starting at a point in time when the plunger is at bottom dead center.

5. The fuel injection system according to claim 1, wherein:
said compression space and said fuel supply path are in communication with each other after said plug valve is seated on said valve seat, and
said communication is cut off after said sub pulse is generated and before said main pulse is generated.

6. The fuel injection system according to claim 1, wherein:
said plug valve, which adjusts the state of communication between the compression space side and the fuel intake side of said fuel supply path, closes off said fuel supply path when power is supplied to said solenoid and allows communication between the sides of said fuel supply path when the power supply is turned off.

7. The fuel injection system according to claim 6, wherein:
said plug valve is provided in a valve housing that is an integrated part of said injection pump main body and said plug valve is linked to an armature,
said plug valve is also provided with a valve head located in a valve head housing chamber that is enclosed by said valve housing and a header on said valve housing,
a circular groove is formed around said plug valve,
said fuel intake side of said fuel supply path communicates with said valve head housing chamber and said compression space side of said fuel supply path communicates with said circular groove;
said valve seat is formed in said valve housing between said valve head housing chamber and said circular groove, and
said plug valve is under a spring force in a direction in which is tends to be separated from said valve seat.

8. The fuel injection system according to claim 1, wherein;
the time lapse between said sub pulse and said main pulse is set longer than the time period starting when said plug valve is seated on said valve seat and ending when said plug valve returns to the full open state.

9. A fuel injection system, comprising:
an injection pump unit comprising an injection pump main body having a barrel formed therein, a plunger inserted into said barrel such that said plunger slides freely therein, a compression space in a region enclosed by said barrel and said plunger, a high pressure path for conducting fuel from said compression space and a fuel supply path for supplying fuel from a fuel intake to said compression space;
a solenoid valve unit located in said fuel supply path of said fuel injection pump unit, said solenoid valve unit comprising a plug valve for adjusting the state of communication between a compression space side of said fuel supply path and a fuel intake side of said fuel supply path and a solenoid for operating said plug valve, the operation of said plug valve being controlled by an external control signal supplied to said solenoid;
a nozzle unit connected with said high pressure path for supplying fuel from said high pressure path to an engine; and
a leak port formed on a side surface of said barrel that communicates with said fuel supply path, wherein a fuel escape path is formed in said plunger that communicates said compression space with said leak port within a specific positional range of said plunger in said barrel, and a drive pulse is supplied as an external control signal to said solenoid to close off said fuel supply path with said plug valve during and after the period of time during which said leak port and said fuel escape path communicate with each other.

10. A fuel injection system according to claim 9, wherein said solenoid valve unit includes a valve seat for engagement with said plug valve, and
said period during which said leak port and said fuel escape path communicate with each other occurs after said plug valve is seated on said valve seat.

11. A fuel injection system, comprising:
an injection pump unit comprising an injection pump main body having a barrel formed therein, a plunger inserted into said barrel such that said plunger slides freely therein, a compression space in a region enclosed by said barrel and said plunger, a high pressure path for conducting fuel from said compression space and a fuel supply path for supplying fuel from a fuel intake to said compression space;
a solenoid valve unit located in said fuel supply path of said fuel injection pump unit, said solenoid valve unit comprising a plug valve for adjusting the state of communication between a compression space side of said fuel supply path and a fuel intake side of said fuel supply path and a solenoid for operating said plug valve, the operation of said plug valve being controlled by an external control signal supplied to said solenoid;
a nozzle unit connected with said high pressure path for supplying fuel from said high pressure path to an engine; and
a leak port formed on a side surface of said barrel that communicates with said fuel supply path, wherein a fuel escape path is formed in said plunger that communicates said compression space with said leak port within a specific positional range of said plunger in said barrel, and wherein said injection pump main body is provided with a phase fixing mechanism for fixing the phase between said plunger and said injection pump main body.

12. A fuel injection system according to claim 11 wherein:
said phase fixing mechanism links said plunger to a tappet that slides while maintaining a specific phase in relation to said injection pump main body and clamps said plunger with adjusting tightening members provided on a side surface of said tappet so that said plunger will not rotate.

13. A fuel injection system according to claim 11, wherein said plunger has a base, and
said phase fixing mechanism comprises a linking projection at said base of said plunger and a tappet that slides while maintaining a specific phase in relation to said injection pump main body, said tappet having a basin provided that fits with said linking projection, said basin having a flat area formed where said linking projection and said basin come in contact to prevent rotation.

* * * * *